United States Patent [19]

Desgranges et al.

[11] Patent Number: 5,102,221

[45] Date of Patent: Apr. 7, 1992

[54] APPARATUS FOR RETOUCHING, IN SITU, COMPONENTS SUCH AS THE ROTOR BLADES OF A TURBOMACHINE, AND A RETOUCHING METHOD USING THE APPARATUS

[75] Inventors: Pierre L. Desgranges, Corbeil Essonnes; Jérome Werstler, Dammarie les Lys, both of France

[73] Assignee: Societe Nationale d'Etude et de Construction de Moteurs d'Aviation "S.N.E.C.M.A.", Paris, France

[21] Appl. No.: 600,813

[22] Filed: Oct. 22, 1990

[30] Foreign Application Priority Data

Oct. 25, 1989 [FR] France ................. 89 13966

[51] Int. Cl.$^5$ ............... G01N 21/88; G02B 23/26
[52] U.S. Cl. ................. 356/72; 356/241
[58] Field of Search ............ 356/241, 72, 237; 350/96.26

[56] References Cited

U.S. PATENT DOCUMENTS 4,078,864  3/1978  Howell ................. 356/241
4,659,221  4/1987  Kellie et al. ............. 356/241
4,784,463 11/1988  Miyazaki ............... 356/241 X
4,793,326 12/1988  Shishido ............... 356/241 X

FOREIGN PATENT DOCUMENTS 0150245  8/1985  European Pat. Off. .
1311292 10/1962  France .
2081223 12/1971  France .
2443697  7/1980  France .
2561399  9/1985  France .
 107674 11/1924  Switzerland .

*Primary Examiner*—Vincent P. McGraw
*Attorney, Agent, or Firm*—Oblon, Spivak, McClelland, Maier & Neustadt

[57] ABSTRACT

Apparatus for retouching, in situ, a located defect on a component of an assembly, such as a turbomachine rotor, situated within a casing, the apparatus including an endoscope carried by a body external to the casing, a support tube carried by the body for insertion through a hole in the casing, and a control rod extending along the tube and connected to a foldable extension member pivoted at the end of the tube and carrying a retouching tool.

7 Claims, 7 Drawing Sheets

APPARATUS FOR RETOUCHING, IN SITU, COMPONENTS SUCH AS THE ROTOR BLADES OF A TURBOMACHINE, AND A RETOUCHING METHOD USING THE APPARATUS

BACKGROUND OF THE INVENTION

1. Field of the invention

The present invention relates to apparatus for retouching components, especially turbomachine rotor blades, without dismantling the whole assembly to which they belong, and also to a retouching process constituted by the method of using the said apparatus.

2. Description of the prior art

When inspecting a turbomachine after it has been operating, especially in the case of an aeroengine subject to strict acceptance criteria imposed by the conditions of use, or when checking during maintenance, one or more strictly localized defects may sometimes be found on the surface of some of the rotor blades. These defects ar generally in the form of pits with or without a slight thickening at the edges, and have the appearance of impact marks, slight cuts or material fault marks. Their size is limited to a few tenths of a millimeter. The acceptance of the damaged blade or of the rotor assembly which includes it requires a retouching of the defect with a view to smoothing the edges of the affected area. This type of retouching, requiring the use of a tool for the removal of material, has hitherto necessitated dismantling the assembly concerned, particularly in the case of a multistage compressor, which leads to substantial down times and results in the immobilization of equipment and high costs.

It is also known to use a apparatus for observation and checking of components in areas which are not directly accessible, particularly inside turbomachines or other assembled units. U.S. Pat. No. 4,078,864, FR-A-2 443 697, FR-A-2 561 399 and U.S. Pat. No. 4,659,221 describe examples of the application of these known techniques; but they do not provide any satisfactory solution for the retouching and the correction of defects which can be seen only with the aid of an endoscope.

SUMMARY OF THE INVENTION

The object of the invention is to provide apparatus enabling an operator to carry out the retouching work in areas of difficult access, especially on turbomachine rotor blades, using existing sealable openings provided in particular for the passage of an endoscope in the fixed casing surrounding the area.

To this end, according to the invention there is provided an apparatus for retouching, in situ, a localized defect on a component of an assembly situated within a casing, comprising an observation device in the form of an endoscope including a light source, viewing means, a lens, and connecting means for transmitting an image from said lens to said viewing means, a body carrying said endoscope and arranged to remain outside the casing for control by the operator during use of the apparatus, a support tube carried by the body for insertion through an observation hole provided in the casing, a foldable extension member pivotally mounted at the remote end of the support tube, a control rod extending along said support tube and connected to said extension member for pivoting said member relative to said tube, and a retouching tool carried by said extension member.

In using the apparatus to carry out retouching work, the support tube and lens end of the endoscope are inserted through an observation hole in the casing, the defect is located by visual exploration using the endoscope, the control rod is operated to deploy the extension member and the retouching tool, and the apparatus is reciprocated through the observation hole to cause the tool to work on the edges of the defect under the visual control of the operator using the endoscope.

The apparatus may be reciprocated manually by the operator or, alternatively, the retouching apparatus in accordance with the invention may be driven, the body of the apparatus comprising a reduction geared electric motor for reciprocating the support tube through the intermediary of a connecting rod and crank assembly and a driving member attached to the support tube. In this case, the retouching process involves the automatic working of the tool on the component.

Other features and advantages of the invention will become apparent from the following description of preferred embodiments of the invention, with reference to the accompanying drawings.

DESCRIPTION OF THE PREFERRED EMBODIMENTS

Figure 1:
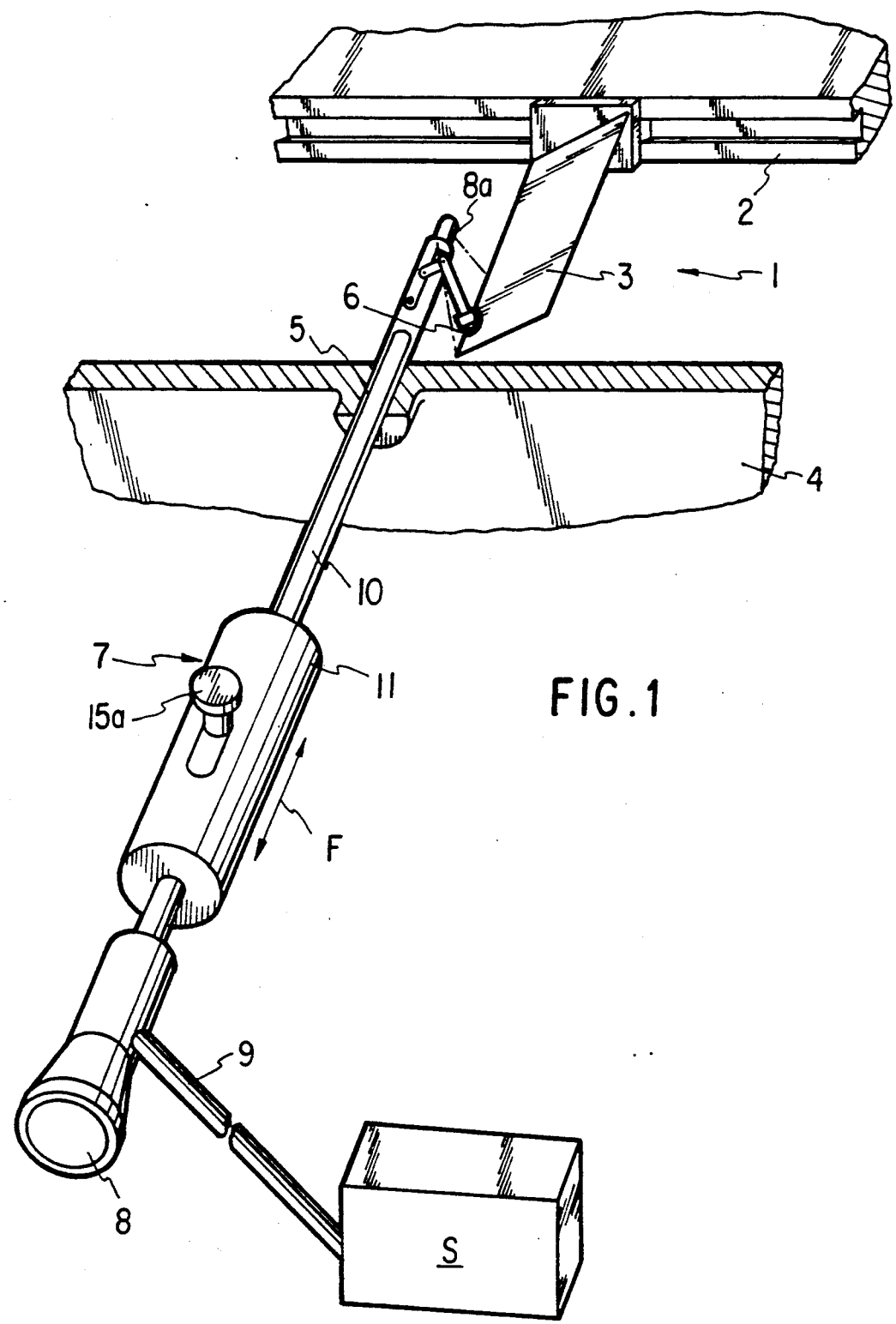
FIG. 1 is a diagrammatic, partly part sectional perspective view of partly of a turbomachine at the level of a mounted rotor showing the use of a first embodiment of the retouching apparatus in accordance with the invention.
Figure 2:
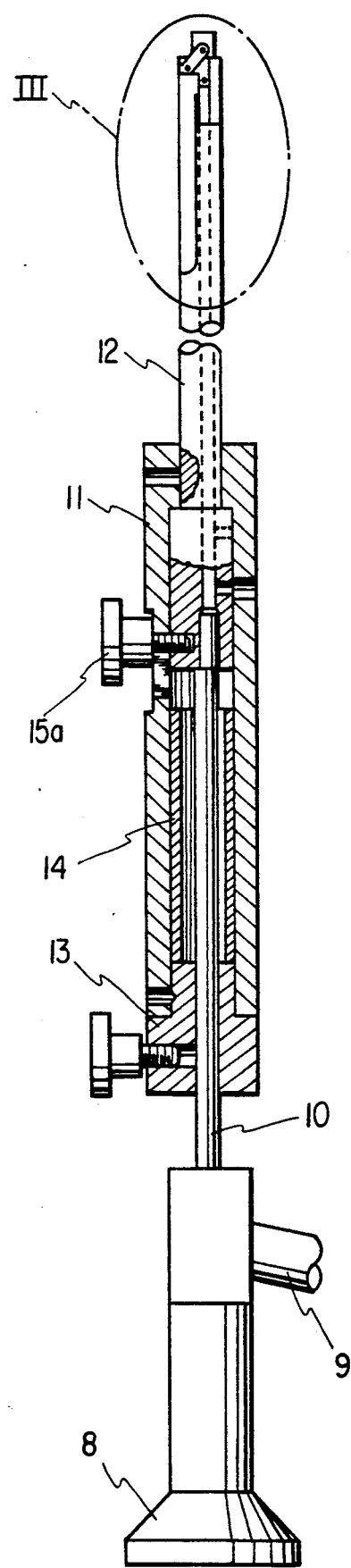
FIG. 2 is a diagrammatic side view, partly in longitudinal section, of the retouching apparatus shown in FIG. 1.

In FIG. 1, which shows an example of the use of retouching apparatus in accordance with the invention for retouching localized defects on a blade of a mounted rotor, the rotor 1 comprises a drum 2 (only partly shown) carrying the blades, one of which 3 belonging to one stage of the rotor is shown. The rotor 1 is mounted in a casing 4 belonging to the turbomachine stator associated with the rotor 1. The casing 4 is provided with holes, one of which is shown at 5, at the level of each stage of the rotor 1 for the passage of an endoscope. The blade 3 shown has on one edge a localized defect 6 detectable by visual examination using an endoscope of a known type. Apparatus 7 in accordance with a first embodiment of the invention and intended for retouching this type of defect, consisting for example of a slight cut or impact mark on the blade, is shown in FIG. 1. Reference is to be made to FIGS. 2 to 5 for the details of the apparatus 7.

The apparatus 7 comprises first of all the standard components of an endoscope of known type for permitting a visual examination of parts inside a turbomachine, particularly the blades of a rotor in the fitted state. Thus, there is an eyepiece 8 for use by the operator, means 9 for connection to a light source not shown in detail and symbolized by S in the drawing, a lens 8a and connecting means 10 establishing an optical path between the eyepiece and the lens, the connecting means 10 being mounted in a body 11 of the apparatus.

The apparatus 7 also comprises a tube 12 rigidly connected to the body 11, for example by a screw.

The assembly of the elements on the body 11 is completed by a plug 13 and an inner strut 14. In accordance with the invention, a control rod 15 extends along the tube 12 in proximity to the endoscope connecting rod 10 and is hingedly connected, as shown in detail in FIGS. 3 and 5, by two hinges having axes 16 and 17, a link 18 and a lever 19, to a foldable extension member 20 which is pivotally mounted at the end of the tube 12 and carries a diamond tool 21. It will be noted that in some applications to aeroengines envizaged by the invention, the diameter of some of the holes, such as 5, for the passage of an endoscope may be only 8 mm, and this must be taken into account by the dimensions of the elements which have been described, the part of the apparatus 7 situated beyond the body 11 having to be such as to be able to slide freely in the hole 5, as will be made clear further on.

A description will now be given of the method of using the retouching apparatus 7, which corresponds to the method in accordance with the invention for retouching localized defects on components not directly accessible, the method being described with reference to the attached drawings and in relation to the retouching of a localized defect on the blade of a rotor mounted in a turbomachine.

Figure 3:
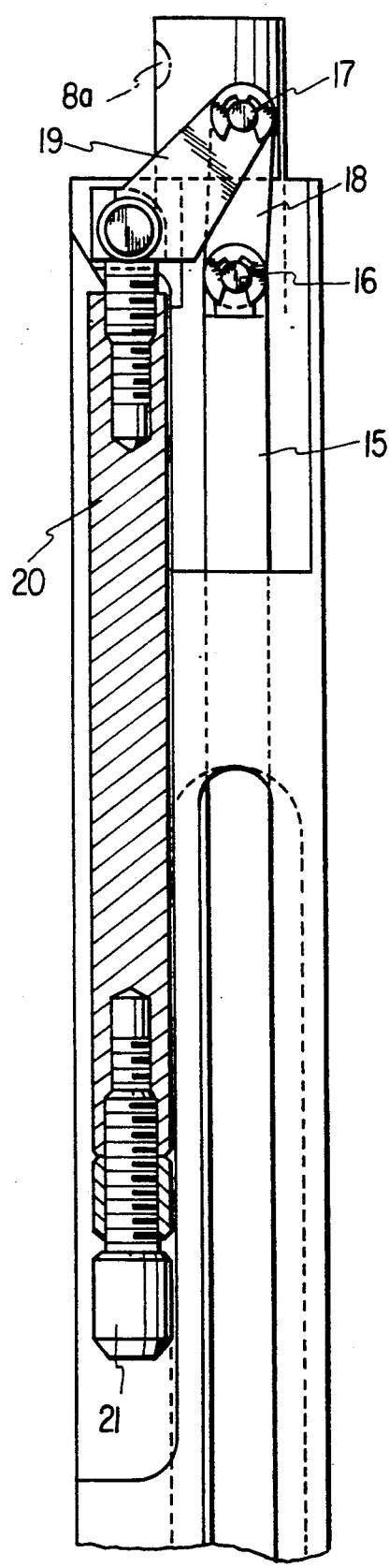
FIGS. 3 and 4 are enlarged detail views of the part of the retouching apparatus indicated at III in FIG. 2.
Figure 4:
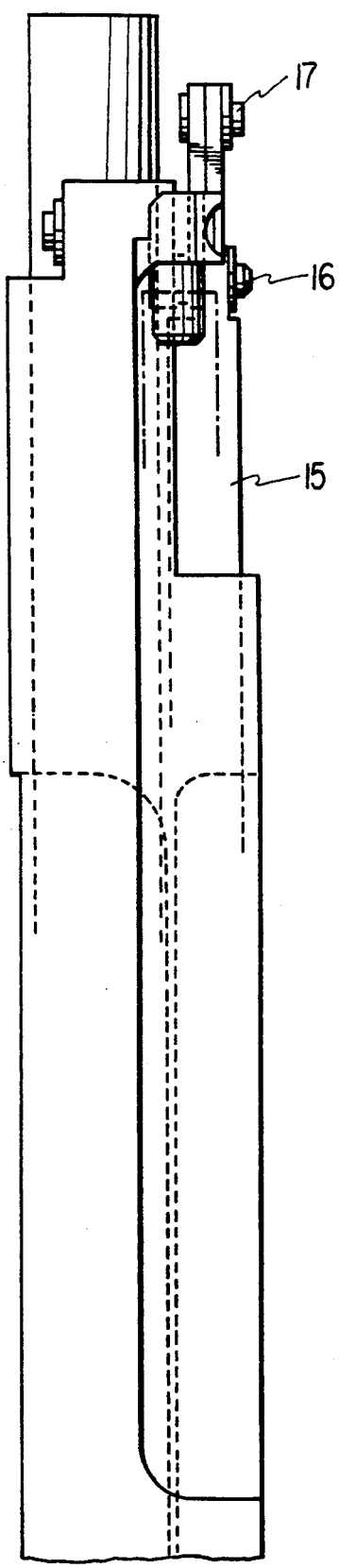
Figure 5:
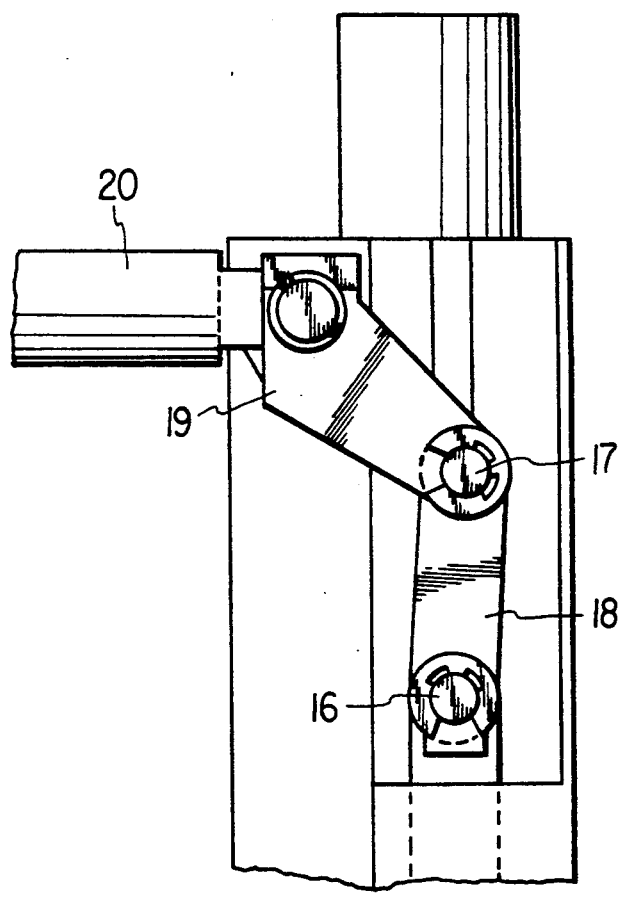
FIG. 5 is a partial view corresponding to FIG. 3, but illustrating the tool support in a deployed position.

In the first stage, the extension member 20 forming the tool carrier of the apparatus 7 is in the folded position shown in FIG. 3, and the part of the apparatus 7 situated beyond the body 11 is introduced through the hole 5 in the casing 4. Then, the operator, by looking through the eyepiece 8 and moving the apparatus 7, effects the locating of the defect 6 on the blade 5 and the corresponding placement of the apparatus 7. In the next stage, the operator actuates the control rod 15 to deploy the tool carrier 20, following the operating principle illustrated in FIG. 5, so as to bring the working part of the tool 21 into contact with the edges of the observed defect 6. After this positioning, the control rod 15 is locked by means of a screw 15a. Then, while monitoring the work being carried out by looking through the eyepiece 8, the operator gently reciprocates the apparatus 7 through the hole 5 of the casing, as indicated by the double arrow f in FIG. 1, so as to cause the tool 21 to perform a mechanical operation of smoothing the edges of the defect 6 by removal of material as a result of the abrasive action of the said tool 21. Finally, when from visual inspection the retouching is deemed to be sufficient, the operator performs the operations in the reverse order to disengage the apparatus 7: refolding the tool carrier 20 by means of the control rod 15 and withdrawing the apparatus 7 from the hole 5 in the casing.

By using the apparatus 7 in accordance with the invention as has just been described, satisfactory retouching results have been obtained. In particular, the required quality has been obtained with a substantial gain of time with respect to retouching carried out by the previously known method, which involves dismantling the turbomachine module concerned. The operating time can thus be reduced by a factor of 2 or 3 depending on the application.

Figure 6:
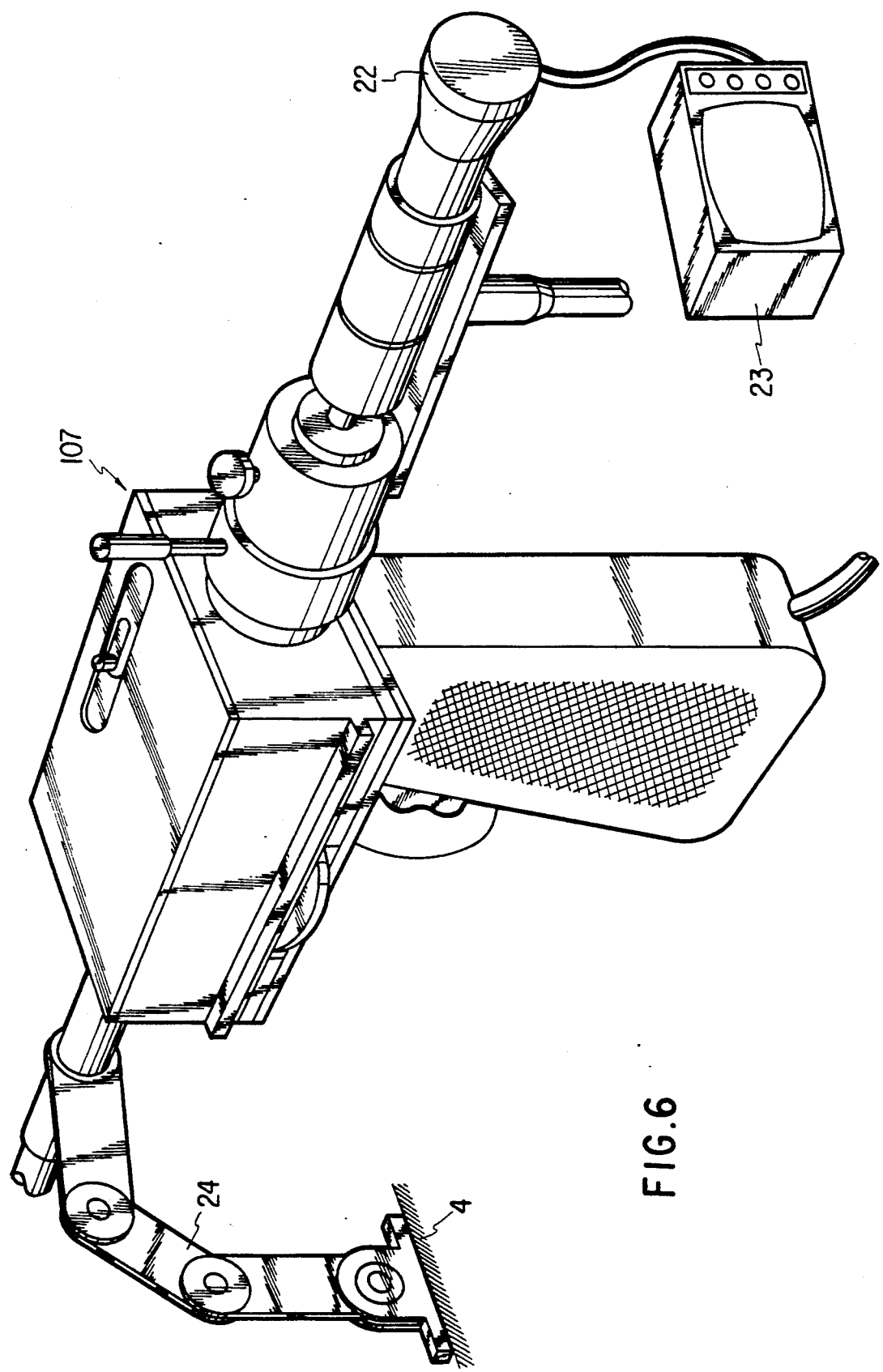
FIG. 6 is a diagrammatic perspective view of a second embodiment of the retouching apparatus in accordance with the invention.

In a second embodiment of the invention shown diagrammatically in FIG. 6, a degree of automation of the operation is obtained by restricting the intervention of the operator to the operations of positioning, adjusting, supervision, verification and removal. The additional aim in this case is to carry out the work of the tool on the defective component in an automated manner.

In the following description of the second embodiment those parts which have identical or similar parts in the first embodiment described with reference to FIGS. 1 to 5 are given corresponding reference numerals increased by one hundred.

Thus, in the apparatus 107 of the second embodiment illustrated in FIGS. 6 and 7, there are again found an eyepiece 108, a connection 109 to a light source S, a connection between the eyepiece and a lens, a tube 112, and a control rod 115 connected by means of links and a lever to a foldable extension member which carries the diamond tool.

However, as an alternative, the eyepiece 108 provided for visual inspection of the defects by the operator may be replaced in a known manner by a video camera 22 connected to a control monitor having a screen 23.

The apparatus 107 is arranged to be mounted on the casing 4 by means of a hinged arm 24 forming a support.

A modified body 111 of the apparatus comprises a barrel 111a which supports the tube 112 and a case 25 fitted with a cover 26 and a bottom 27 extended by a handle 28. The handle 28 is connected to an electrical supply cable 29 and encases a reduction geared electric motor 30 controlled by a switch 31 mounted on a trigger 32. A driving member 33 sliding on an axle 34 mounted inside the case 25 is firmly secured on the tube 112. The driving shaft 35 of the reduction geared motor 30 is connected to the driving member 33 by a rod and crank assembly 36, thus forming a system for automatic longitudinal reciprocation of the tube 112 carrying at its end the retouching filing tool 21. Guiding of the movable assembly is effected by the driving member 33.

An endoscope support 37 extends the casing 25 on the upstream side and includes an arrangement for setting the position of the endoscope. This arrangement comprises a lever 38 and a double cone 39 which clamps the endoscope. A knurled knob 40 makes it possible, by angular adjustment, to orientate the beam of the endoscope to face the defect, particularly on a turbomachine rotor blade. Longitudinal displacement by means of a lever 41 shown in FIG. 8 enables fine adjustment to be achieved, and locking is obtained by tightening a ring 42 which actuates the double cone 39.

Figure 8:
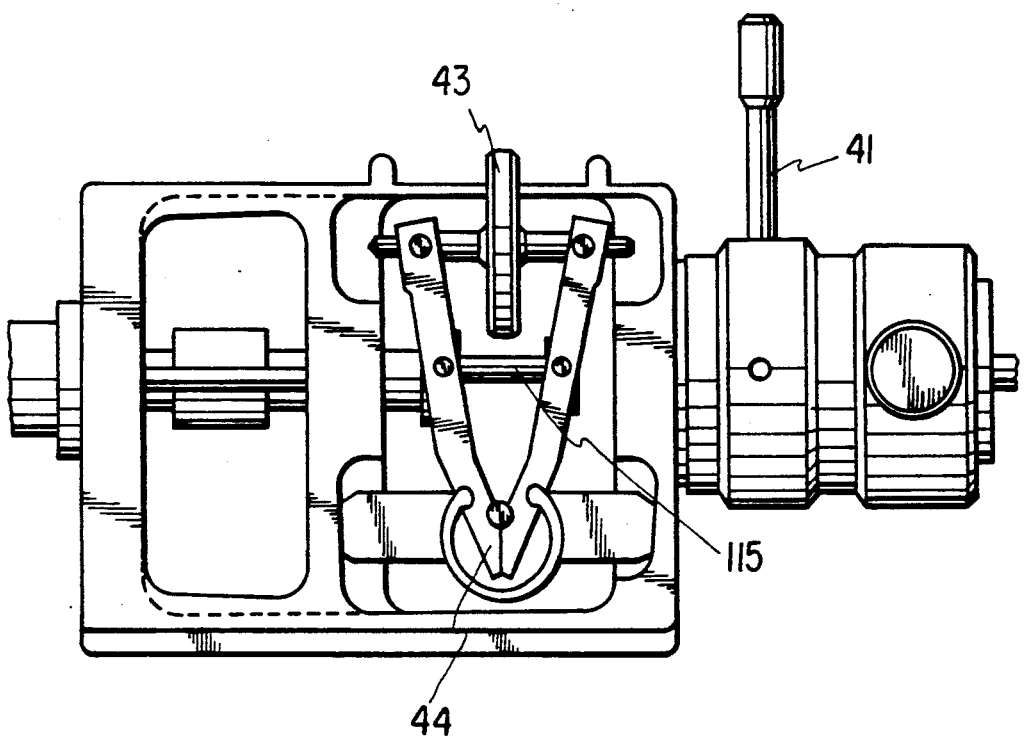
FIG. 8 is a top view, with the cover removed, of part of the apparatus of FIG. 6 and 7; and, FIG. 9 is a sectional view of part of the apparatus taken along line IX—IX of FIG. 7.

As shown in FIG. 8 the movement of the control rod 115 controlling the movement of the extension member 20 and the positioning of the tool 21 is effected by means of a wheel 43 actuating a spring bow divider system 44.

Figure 9:
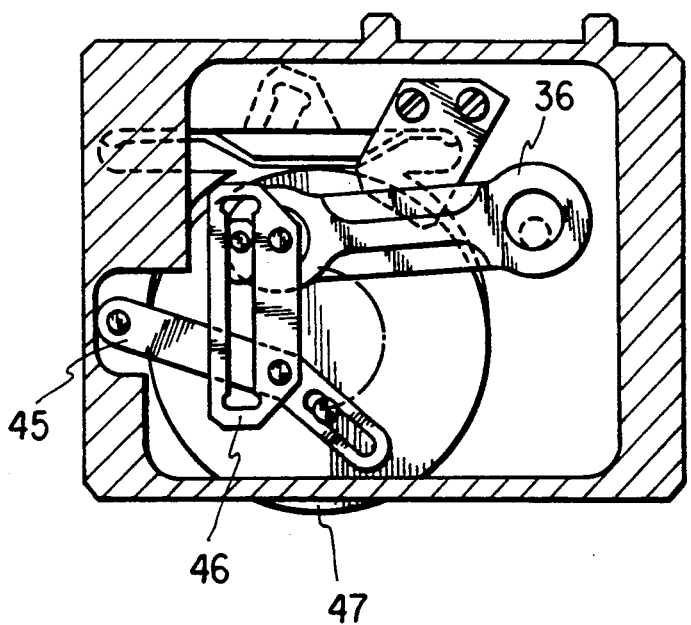

The adjustment of the stroke of the tool 21 before the filing of the defect on the part to be retouched is effected by means of the arrangement shown in FIG. 9.

This arrangement comprises a lever 45 and a slide 46, the position of which is adjusted by means of a wheel 47 and regulates the longitudinal stroke of the rod 36, from which follows the stroke of the movable unit, tube 112 and tool 21.

Figure 7:
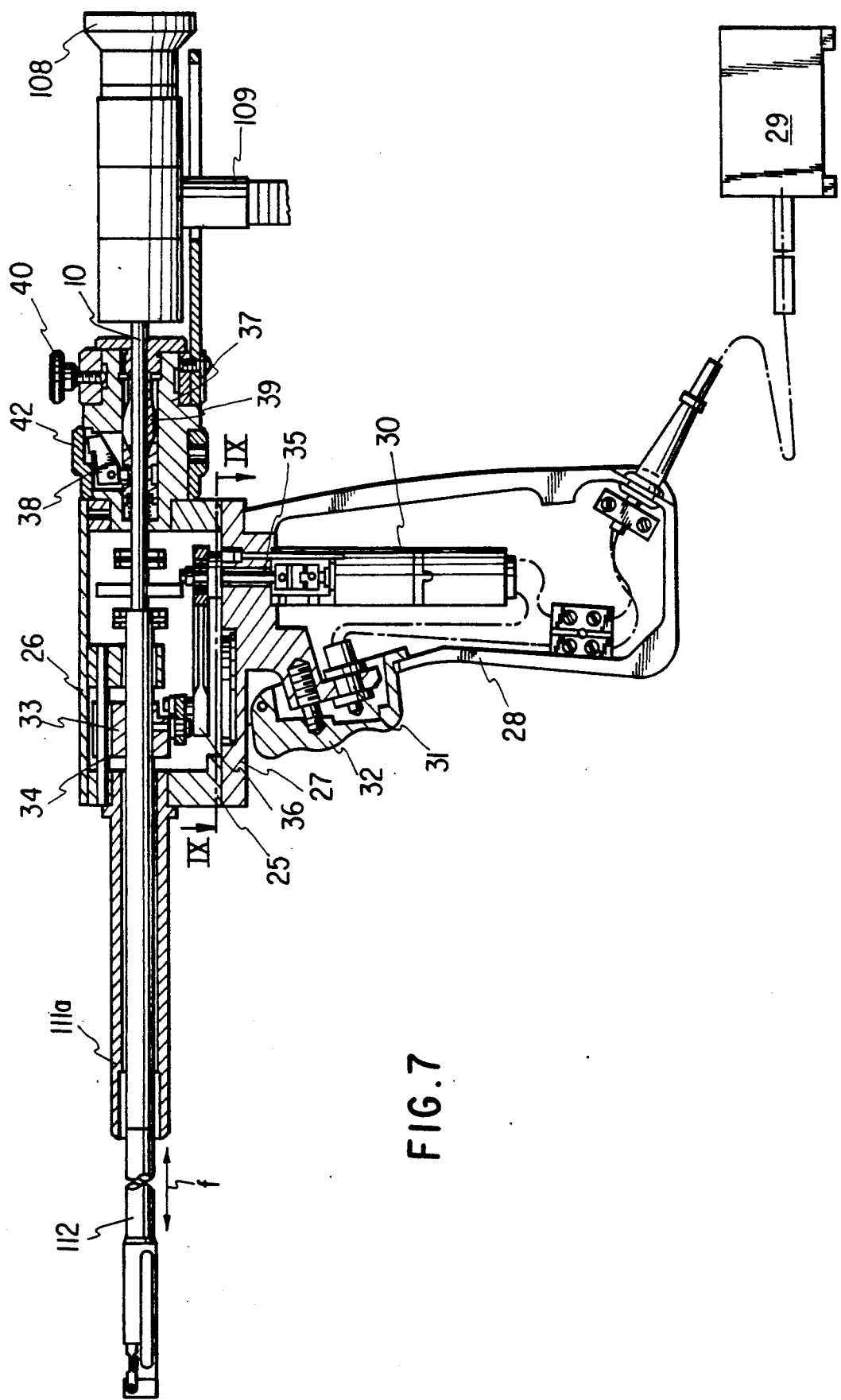
FIG. 7 is a diagrammatic side view, partly in longitudinal section, of the retouching apparatus shown in FIG. 6.

A method of retouching defects located on parts which are not directly accessible, similar to the method described above using the retouching apparatus 7 of FIGS. 1 to 5, has also been perfected using the retouching apparatus 107 which has just been described with reference to FIGS. 6 to 8.

The insertion of the apparatus 107 through an inspection hole in the casing 4 and the visual scanning for a defect to be retouched is carried out in the same way as in the first embodiment. As an alternative, however, direct inspection via the eyepiece 108 may be replaced by observation on the video control monitor 23 using the video camera 22 as already mentioned. After the defect to be retouched has been located, the operator sets the position of the apparatus 107 by locking the fixing of the hinged arm 24 on the casing 4, adjusting the angular and longitudinal settings using the knurled knob 40 and the lever 41, and then locking the assembly by tightening the ring 42. He then attends to the positioning and fine setting of the tool 21 by operating the rod 115 by means of the wheel 43 so as to bring the working part of the tool 21 into contact with the edges of the observed defect 6. He completes these operations by adjusting the stroke of the tool 21 using the wheel 47. Finally, he actuates the switch 31 to start the reduction gear motor 30, thereby reciprocating the tube 112 and the movable unit so as to cause the tool 21 to smooth the edges of the defect 6 by filing material away, in a manner similar to the operation performed by the manual method previously described but avoiding the risks associated in that case with relying only on the manual dexterity of the operator.

As the operation proceeds, the operator keeps watch over the work, either through the eyepiece 108 or by looking at the picture provided by the video control monitor 23. When the retouching is deemed to be complete, the operator terminates the operation by stopping the motor 30, releasing the apparatus 107, folding back the tool carrier 20 by means of the wheel 43, unlocking the hinged arm 24, and removing the apparatus from the casing.

Obviously, numerous modifications and variations of the present invention are possible in light of the above teachings. It is therefore to be understood that within the scope of the appended claims, the invention may be practiced otherwise than as specifically described herein.

What is claimed is:

1. Apparatus for retouching, in situ, a localized defect on a component of an assembly situated within a casing, comprising:

an observation device which includes an endoscope including a light source, viewing means, a lens, and connecting means for transmitting an image from said lens to said viewing means, a body carrying said endoscope and arranged to remain outside the casing for control by the operator during use of the apparatus, a support tube carried by said body for insertion through an observation hole provided in said casing, a foldable extension member pivotally mounted at the remote end of said support tube, a control rod extending along said support tube and connected to said extension member for pivoting said extension member relative to said tube, and a retouching tool carried by said extension member;

a rod and crank unit connected to said support tube; and a wheel actuated lever and slide system for engaging said rod and crank unit for adjusting the longitudinal stroke of said support tube and thus said retouching tool.

2. Apparatus according to claim 1, wherein said control rod is connected to said extension member by a link and a lever, said link being hinged at one end to said control rod and at its other end to said lever.

3. Apparatus according to claim 1, wherein said viewing means of said endoscope comprises a video camera and a monitor screen.

4. Apparatus according to claim 1, wherein said support tube is movable longitudinally relative to said body, and said body houses a reduction geared electric motor which is arranged to reciprocate said support tube through the intermediary of a rod and crank unit and a driving member which is fixed to said support tube.

5. Apparatus according to claim 4, wherein said body includes an endoscope holder in which said endoscope is clamped in a double cone locking device connected by a lever to a tightening ring, and said endoscope holder is fitted with an angle-adjustment knob and a longitudinal adjustment lever for adjusting the position of said endoscope.

6. Apparatus according to claim 4, wherein a spring bow divider system having an operating wheel is connected to said control rod for effecting movement of said rod 7. A method of retouching a localized defect on a component, such as a turbomachine rotor blade, of an assembly situated within a casing provided with an observation hole therein, the method comprising the following steps:

(a) providing retouching apparatus having an observation device which includes an endoscope including a light source, viewing means, a lens, and connecting means for transmitting an image from said lens to said viewing means, a body carrying said endoscope and arranged to remain outside the casing for control by the operator during use of the apparatus, a support tube carried by said body for insertion through an observation hole provided in said casing, a foldable extension member pivotally mounted at the remote end of said support tube, a control rod extending along said support tube and connected to said extension member for pivoting said extension member relative to said tube, and a retouching tool carried by said extension member;

(b) inserting the support tube and lens end of the endoscope of said apparatus through said observation hole in said casing;

(c) locating said defect by visual scanning of said component by means of said endoscope;

(d) positioning said apparatus and securing the body thereof to said casing;

(e) adjusting the angular and longitudinal setting of said endoscope and then locking said endoscope in position relative to said body;

(f) operating the control rod to move the extension member and the retouching tool of said apparatus to a desired position;

(g) setting the stroke o said retouching tool;

(h) starting the motor of said apparatus to effect reciprocating movement of said support tube and thereby cause said retouching tool to work on the edges of said defect while maintaining visual observation using said endoscope;

(i) stopping said motor when retouching of said defect has been completed, operating said control rod to fold back said extension member, disconnecting said body from said casing, and withdrawing said apparatus from said observation hole.

* * * * *

UNITED STATES PATENT AND TRADEMARK OFFICE
CERTIFICATE OF CORRECTION

PATENT NO. : 5,102,221

DATED : April 7, 1992

INVENTOR(S) : Pierre L. Desgranges et al.

It is certified that error appears in the above-identified patent and that said Letters Patent is hereby corrected as shown below:

```
Column 1, line 13, delete "said";
          line 21, change "ar" to --are--;
          line 34, change "a" to --an--.
Column 2, line 15, after "involves" delete "the";
          line 23, delete "part";
          line 24, change "partly" to --part--.
Column 6, line 57, change "o" to --of--.
```

Signed and Sealed this

Twentieth Day of July, 1993

Attest:

MICHAEL K. KIRK

Attesting Officer    Acting Commissioner of Patents and Trademarks